United States Patent [19]

Ferrieu

[11] 4,321,430
[45] Mar. 23, 1982

[54] SUBSCRIBER'S CONNECTING NETWORK COMPRISING A SYMMETRICAL POWER AMPLIFIER FOR FEEDING A SUBSCRIBER'S LINE

[75] Inventor: Gilbert M. M. Ferrieu, Paris, France

[73] Assignee: Telecommunications Radioelectriques et Telephoniques T.R.T., Paris, France

[21] Appl. No.: 175,810

[22] Filed: Aug. 6, 1980

Related U.S. Application Data

[63] Continuation of Ser. No. 26,103, Apr. 2, 1979, abandoned.

[30] Foreign Application Priority Data

Apr. 3, 1978 [FR] France .................. 78 09743

[51] Int. Cl.³ ............. H04M 3/22; H04M 19/00
[52] U.S. Cl. ................. 179/18 FA; 179/18 HB; 179/77
[58] Field of Search ............ 179/18 HB, 51 AA, 77, 179/16 AA, 16 A, 16 EC, 84 A, 18 FA

[56] References Cited

U.S. PATENT DOCUMENTS

| | | | |
|---|---|---|---|
| 4,087,647 | 5/1978 | Embree et al. | 179/77 |
| 4,133,986 | 1/1979 | Picandet et al. | 179/18 FA X |
| 4,152,670 | 5/1979 | Rimondini et al. | 179/18 HB X |

Primary Examiner—Thomas W. Brown
Attorney, Agent, or Firm—Thomas A. Briody; William J. Streeter; Laurence A. Wright

[57] ABSTRACT

A subscriber's connecting network comprising a symmetrical power amplifier which is formed by two pairs of complementary transistors. Resistors having the same values are arranged in collector circuits of the transistors of the symmetrical amplifier for limiting the current in the subscriber's line. In addition, means are present for making the base voltage dependent on the collector voltage of this transistor so that a predetermined voltage is present between these two electrodes in the normal direction of operation. Finally a by-pass capacitor for the speech currents in the subscriber's line is arranged between two input terminals of the symmetrical amplifier. The invention is particularly suitable for a network in which binary signals are used for the generation of ringing signals and metering signals in the subscriber's line.

7 Claims, 11 Drawing Figures

SUBSCRIBER'S CONNECTING NETWORK COMPRISING A SYMMETRICAL POWER AMPLIFIER FOR FEEDING A SUBSCRIBER'S LINE

This is a continuation of application Ser. No. 026,103, filed Apr. 2, 1979, now abandoned.

BACKGROUND OF THE INVENTION

The invention relates to a subscriber's connecting network comprising a symmetrical power amplifier which is formed by two pairs of complementary transistors, the bases and the emitters of each pair of transistors being interconnected and forming two input and two output terminals, respectively, of the symmetrical amplifier, whereas the collectors of the transistors of one type are coupled to a first terminal of a d.c. voltage source and the collector of the transistors of the other type are coupled to a second terminal of the d.c. voltage source, the output terminals being connected to the terminals of a subscriber's line and the input terminals being coupled to the terminals of the d.c. voltage source via two input impedances.

As known, a subscriber's connecting network is an arrangement for connecting a subscriber's line to a telephone exchange and, by means of this arrangement, it must be possible to apply different voltages to the subscriber's line under the control of the exchange. Examples of these voltages are the ringing voltage having a frequency of, for example, 25 or 50 Hz, a d.c. voltage of a given polarity for transmitting dialling information and speech signals and a metering signal having a frequency of, for example, 12 kHz. For signalling purposes the subscriber's circuit must also be capable of reversing the polarity of the d.c. voltage on the subscriber's line.

The realization of these different voltages on the subscriber's line entails practical problems which can generally not be solved in a simple and economic manner. The ringing voltage, which is a sinusoidal voltage to prevent disturbing harmonics from occurring on the subscriber's line is derived from a bulky and expensive transformer. It is known to include a winding of such a transformer in a wire of the line, in which case this winding must then have a low impedance for speech signals. Alternatively, it is known to connect the transformer winding for the duration of the ringing signal to the terminals of the subscriber's line via relay contacts.

In Applicant's non-prepublished Netherlands Patent Application No. 7,810,301 it has been proposed to perform the above-mentioned supply functions without the use of a transformer or a relay but exclusively with solid-state integrated components by using a connecting network comprising a symmetrical power amplifier, two output terminals which are connected to the subscriber's line. Each input terminal of the power amplifier is connected to the output of a digital-to-analogue converter, an input terminal of each digital-to-analogue converter being connected to one or the other terminal of the d.c. voltage source via a switching network. The switching networks are controlled in anti-phase by a binary digital signal generated under the control of the telephone exchange, the digital signal characterizing the voltage desired for the subscriber's line.

Feeding the subscriber's line via a symmetrical power amplifier gives rise to problems in limiting the current in the transistors of this amplifier in the case of very short lines or accidental short-circuiting of the line. Further, the different administrations require the current derived from the supply source to be limited in the subscriber's line by a resistor having a predetermined value R, for example 300Ω in France.

In order to protect the transistors of the symmetrical amplifier and at the same time satisfy the requirements of the administrations, this current limitation can be realized by arranging two resistors, each having a value R/2, between the two output terminals of the symmetrical amplifier and the two ends of the subscriber's line. This, however, has the drawback that a by-pass capacitor for the speech current must be connected to the terminals of each of these resistors. Each capacitor must have a comparatively large capacitance and must be capable of carrying a d.c. voltage having a value of half the supply voltage into two directions. In order to guarantee the symmetry of the amplifier, the two capacitors must be as equal as possible. This current limitation method therefore requires comparatively expensive and bulky by-pass capacitors.

Current limitation by means of the polarized transistors of the symmetrical amplifier, the transistors playing the role of resistance, results in such a high dissipation in these transistors that integration is very difficult.

It is an object of the invention to provide a subscriber's connecting network of the type mentioned in the preamble, the current in the subscriber's line and in the transistors of the symmetrical amplifier being limited so as to enable the integration of as many components as possible.

According to the invention the subscriber's connecting network is therefore characterized in that in the collector circuit of the transistors of one type and in the collector circuit of the transistors of the other type two equal resistors are included for limiting the current in the subscriber's line. Means are provided for rendering the base voltages of the transistors dependent on the collector voltages thereof and a by-pass capacitor is arranged between the input terminals of the symmetrical power amplifier for the speech currents in the subscriber's line.

The result of such an arrangement is that the transistors of the symmetrical amplifier can operate near saturation so that the dissipated power is sufficiently low to enable integration. In addition, the by-pass capacitor may have a rather low value, for example a hundred times lower than would be required for a capacitor applied across the terminals of a current limiting resistor.

BRIEF DESCRIPTION OF THE DRAWING

Embodiments of the subscriber's connecting network according to the invention will be further explained by way of non-limitative examples with reference to the drawings in which.

DETAILED DESCRIPTION OF THE PREFERRED EMBODIMENTS

Figure 1:
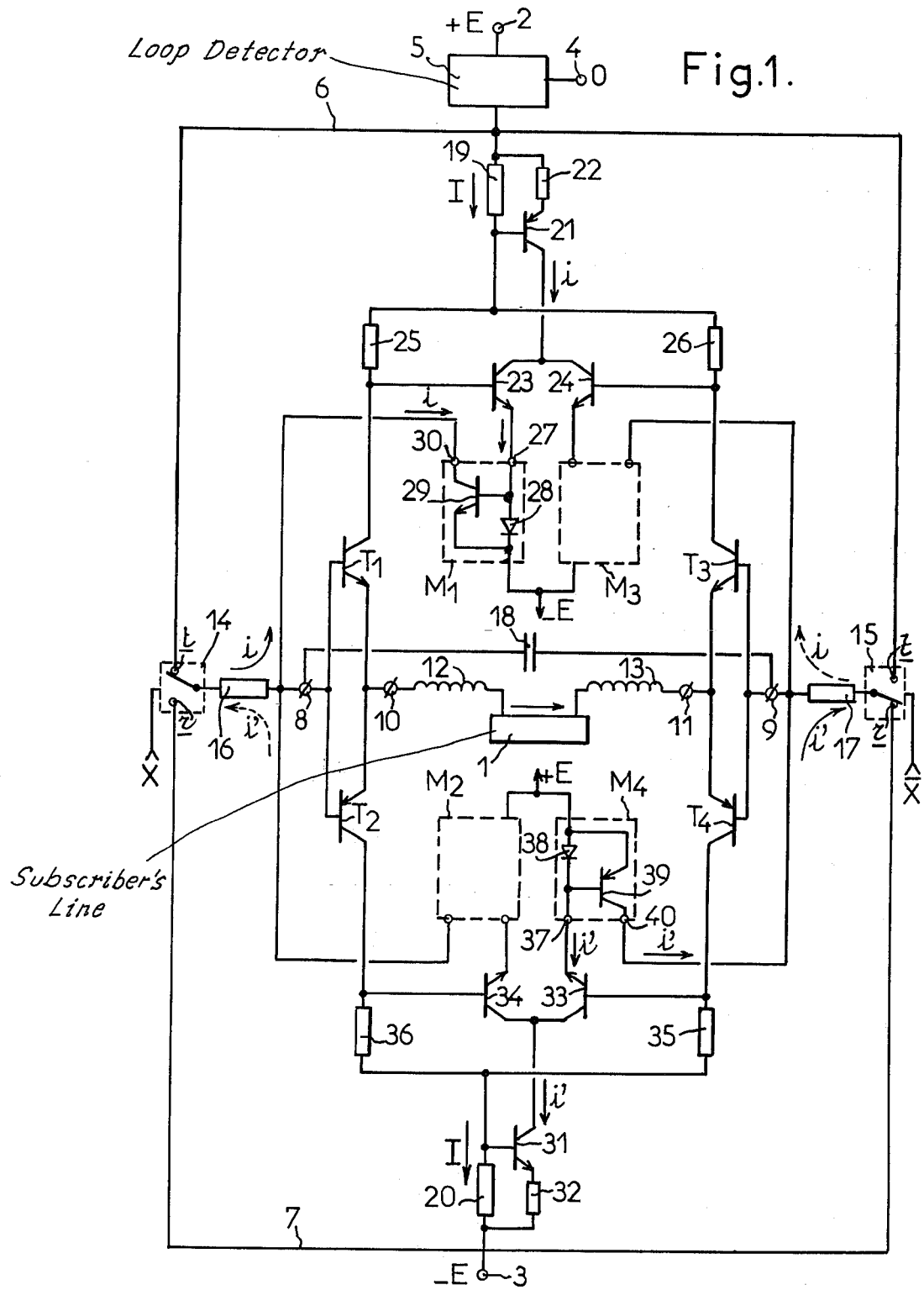
FIG. 1 shows a circuit diagram of an embodiment of the network according to the invention.

In the subscriber's connecting network shown in FIG. 1 the subscriber's line 1 is supplied from a supply source whose terminals 2 and 3 are connected to the potentials $+E$ and $-E$, E being equal to, for example, 48 volts. The current flows from terminal 2 through a loop detector 5 having an output connected to the positive supply line 6 of the network. The loop detector 5 is a threshold value device of a known type, which compares the current flowing through it with a threshold value for supplying to the telephone exchange a signal which indicates whether the subscriber's loop is in the open or in the closed condition. Hereinafter it is assumed that the subscriber's line must be supplied with a d.c. voltage $E=48$ V. Loop detector 5 must, in case a closed subscriber's line is detected, adjust the positive supply line 6 of the network to the zero potential of the centre terminal 4 of the supply source. If the subscriber's loop is in the open condition, the potential on the supply line 6 must be equal to $+E$. The negative supply line 7 of the network is always connected to the potential $-E$ of terminal 3.

This network comprises a symmetrical power amplifier comprised of two pairs of complementary transistors $(T_1, T_2)$, $(T_3, T_4)$. Each transistor may also be a composite circuit of the type known as a Darlington circuit, operating in the same manner as a single transistor having a high gain factor.

The bases of the transistors $(T_1, T_2)$ and of $(T_3, T_4)$ are interconnected and form the input terminals 8, 9 of the symmetrical amplifier. The emitters of these transistors are also interconnected to form the output terminals 10, 11 of the amplifier. These output terminals 10, 11 are connected to the subscriber's line 1 via the windings 12, 13 of a transformer, not shown, which transfers the speech signals to the exchange. The collectors of the npn transistors $T_1$ and $T_3$ are interconnected so that they can be supplied by the voltage on the positive supply line 6. The collectors of the pnp transistors $T_2$ and $T_4$ are interconnected in order to be supplied by the voltage on the negative supply line 7.

The two input terminals of the symmetrical amplifier are connected to two switching circuits 14 and 15 via resistors 16 and 17. The resistors 16 and 17 form two integration networks together with a capacitor included between the terminals 8 and 9. The two corresponding terminals t of the switching circuits 14 and 15 are connected to the positive supply line 6 and the two corresponding terminals r are connected to the negative supply line 7.

The two switching circuits 14 and 15 are controlled in anti-phase, under the control of the telephone exchange, by the complementary signals X and $\overline{X}$, X being a binary signal characterizing the voltage to be applied to the subscriber's line.

When the binary signal X has a certain constant value which adjusts the two switching networks 14, 15 to the position shown in the Figure, the transistors $T_2$ and $T_3$ are cutoff and the subscriber's line 1, when the loop is closed, is supplied by a d.c. voltage E, the current flowing into the shown direction from the terminal 10 to the terminal 11. When the binary signal X has an opposite value so that the switching networks 14 and 15 are adjusted to the other position, only the transistors $T_2$ and $T_3$ pass current and the current flows into the opposite direction to the subscriber's line.

When the binary signal X is a signal obtained by means of delta modulation from a sinusoidal signal having a frequency equal to the frequency of the ringing signal (for example 50 Hz) the switching circuits 14 and 15 function, in combination with the integration networks formed by the resistors 16 and 17 and the capacitor 18, as delta demodulators. Two substantial sinusoidal voltages, having the frequency of the ringing signal are then produced in anti-phase at the two input terminals 8 and 9 of the symmetrical amplifier. In the open condition of the subscriber's loop the potentials of the supply lines 6 and 7 are equal to E and $-E$, respectively, and the above-mentioned sinusoidal voltages have an amplitude E. The transistors $T_1$, $T_2$, $T_3$ and $T_4$ of the symmetrical amplifier operate as emitter follower having a voltage gain equal to unity and, leaving the voltage drop across the transistors $T_1$ to $T_4$ and across the transformer windings 12 and 13 out of consideration, a sinusoidal ringing voltage, having an amplitude which is approximately equal to 2E is then produced across the terminals of the subscriber's line 1.

There now follows a description how the limitation of the direct current flowing in the subscriber's line from terminal 10 to terminal 11 is achieved, that is to say when the switching networks 14, 15 are in the shown position, so that the current in the subscriber's line flows through the collector-emitter space of the transistors $T_1$, $T_4$.

The collectors of the transistors $T_1$ and $T_4$ are connected to the supply lines 6 and 7, respectively, via two resistors 19 and 20, having the same value R/2, which corresponds to the value required for limiting the current.

The base of the pnp transistor 21 is connected to that end of the resistor 19 which is connected to the collector of $T_1$ and the emitter thereof is connected to the other end of the resistor 19 via the resistor 22. The collector of the transistor 21 is connected to the interconnected collectors of the pnp transistors 23 and 24. The bases of these transistors are interconnected via the low-value resistors 25, 26 (a few ohms), which are arranged in the collector current path of the transistors $T_1$, $T_3$. This circuit, formed by the transistors 23, 24, forms a change-over circuit which, when the transistor $T_1$ is in the conductive state sends the collector current i of the transistor 21 to the emitter of transistor 23, which is connected to the input 27 of the current mirror $M_1$. It is known that a current mirror is a circuit which furnishes at its output a current which is in a properly defined ratio to the current at its input. In the proposed form, the current mirror $M_1$ consists of a diode 28 which is connected between the base and the emitter of the pnp transistor 29 in the same direction as the base-emitter diode of this transistor. The base of the transistor constitutes the input terminal 27 of the current mirror; its collector constitutes the output terminal 30 of the current mirror; finally, its emitter is connected to the potential $-E$ of the supply terminal 3. The output terminal 30 of the current mirror $M_1$ is connected to the input terminal 8 of the symmetrical amplifier.

Similar circuits, comprising transistors which are complementary to the transistors associated with resistor 19, are connected to the resistor 20, which is arranged in the collector current path of the transistor $T_4$ of the symmetrical amplifier, which is conductive when $T_1$ conducts. Thus there is formed across the terminals of the resistor 20 a series arrangement of the resistor 32 and the base-emitter diode of the transistor 31, the collector current $i'$ of which flows to the input 37 of the current mirror $M_4$ by means of the change-over circuit consisting of the transistors 33, 34 and the resistors 35, 36. The current mirror $M_4$ is formed by the diode 38 and the transistor 39 and is supplied by the potential $+E$ of the supply terminal 2. Finally, the output terminal 40 of the current mirror $M_4$ is connected to the input terminal 9 of the symmetrical amplifier.

In the situation described above the network operates in the following manner. The current in the subscriber's line which flows through the transistors $T_1$, $T_4$ is limited by the resistors in the collector current part of these transistors, that is to say predominantly by the resistors 19 and 20. The function of associated circuits is to make the base voltage of the transistors $T_1$ to $T_4$ dependent on the collector voltage which depends on the voltage drop across the resistors 19 and 20, so that these transistors are prevented from becoming saturated, these transistors operating in a linear range which is, however, so close to the saturation state that only little power is dissipated. Operation in the linear condition is necessary to enable modulation of the subscriber's line current by speech signals whereas, owing to the fact that only little power is dissipated, integration of the transistors $T_1$ to $T_4$, inclusive, is made possible.

The following description explains how this result is obtained as regards the transistor $T_1$. A current I through the resistor 19 having a value R/2 reduces the collector voltage of the transistor $T_1$ by the value (RI/2). Assuming $\rho$ to be the value of the resistor 22, the collector current I of the transistor 21 is approximately equal to (RI/2$\rho$). By means of a current mirror $M_1$ designed for a current ratio equal to unity, this current I flows into the shown direction, via the resistor 16 which is connected to the input of the symmetrical amplifier, that is to say to the base of $T_1$. A value equal to $\rho_1$ can then be chosen for the resistor 16 so that a decrease (RI/2) of the collector voltage of the transistor $T_1$ corresponds to a decrease of the base voltage: (RI/2-$\rho$)·$\rho$=(RI/2). Thus, the base voltage of $T_1$ is subjected to the same changes as the collector voltage of $T_1$ and it is therefore clear that it is possible to ensure a substantially constant potential difference between these two electrodes, it being possible to fix this difference at a low value of a few volts; it can be seen that the voltage drop in the emitter-collector space of the transistor $T_1$ remains substantially constant and in the same order of magnitude of a few volts. Consequently, the transistor $T_1$ is never in the saturated state and always dissipates a comparatively low power.

As regards the other transistor $T_4$, which is conductive at the same time as $T_1$, it is shown in a similar manner that the collector current $i'$ of the transistor 31 flows by means of the current mirror $M_4$ into the shown direction via the resistor 17. If the resistors 32 and 17 have the same value $\rho$ as the resistors 22 and 16, one can easily see that the changes in the base and collector voltages of the transistor $T_4$ are identical but opposite to the changes in the base and collector voltages of the transistor $T_1$. The transistor $T_4$ therefore is never in the saturated state and measures can be taken to ensure that only little power is dissipated.

If one wants to have a direct current flow in the subscriber's line 1 in the direction opposite to that shown, that is to say from the terminal 11 to the terminal 10, the switching networks 14 and 15 are adjusted to the position which is the reverse of the shown position and the line current flows to the conducting transistors $T_3$ and $T_2$. The same resistors 19 and 20 having the value R/2 are used to limit the current in the subscriber's line.

To make the base voltage of $T_3$ dependent on the collector voltage, the collector current i of the transistor 21 is applied to resistor 17 via the transistor 24 and the current mirror $M_3$, which is identical to $M_1$, the current flowing through resistor 17 into the direction indicated by the dotted arrow. The current $i'$ of the transistor 31 flows through the resistor 16 via the transistor 34 and the current mirror $M_2$, which is identical to $M_4$, into the direction indicated by the dotted arrow. From this it follows, in the same manner as described above, that the transistors $T_3$, $T_2$ are never saturated and that only little power is dissipated in them.

Finally, the capacitor 18, which is connected between the input terminals 8, 9 of the symmetrical amplifier, forms a by-pass for the variable speech currents generated in the subscriber's line. When the direct current in the subscriber's line flows through the transistors $T_1$ to $T_4$, inclusive, these variable signals are short-circuited by the capacitor 18 via the base-emitter diodes of these transistors and they do not flow through the resistors 19 and 20, which consequently need not be decoupled by means of capacitors.

This mode of operation enables the use of a comparatively low-value by-pass capacitor 18. Namely, whereas by-pass capacitors at the terminals of the resistors 19 and 20 would require low impedance values relative to the value R/2 of these resistors, it is only required for the impedance value of the capacitor 18 to be low relative to the value $\rho$ of the resistors 22 and 32. The capacitance is reduced by a factor of 100.

Finally, it should be noted that in the embodiment shown in FIG. 1, the use of the by-pass capacitor 18 does not entail any extra expense because this capacitor is already required for forming the two integration networks in combination with the two resistors 16 and 17, these integration networks having for their function the demodulation of the complementary signals X and $\overline{X}$.

Figure 2:
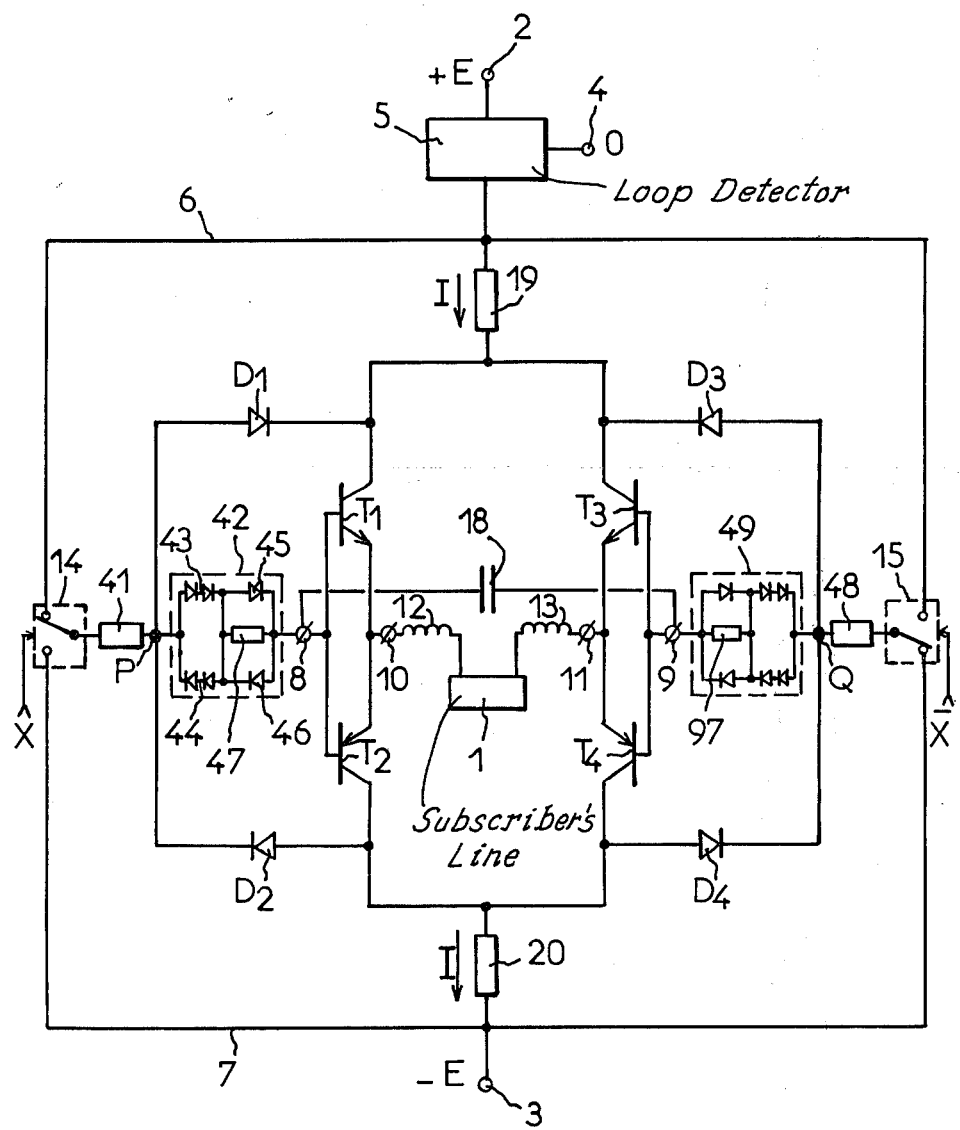
FIG. 2 shows a circuit diagram of another embodiment of the network according to the invention.

A second embodiment of the network according to the invention is shown in the diagram of FIG. 2, wherein elements which are identical to those in FIG. 1 are given the same reference numerals. Also this embodiment comprises two current limiting resistors 19 and 20, which are arranged in the collector current path of the transistors $T_1$ to $T_4$, inclusive, of the symmetrical amplifier. A by-pass capacitor for the speech signal is also here connected between the input terminals 8, 9 of the asymmetrical amplifier, this capacitor also being part of the integration networks which are connected to the outputs of the switching networks 14 and 15. This diagram differs from the diagram of FIG. 1 in the manner in which the base voltage is made dependent on the collector voltage of the transistors $T_1$ to $T_4$, inclusive, to prevent them from becoming saturated.

To achieve this, the collector of the transistor $T_1$ is connected via the diode $D_1$ to a terminal $P_1$ which constitutes a tap of the impedance which is connected to the input 8 of the symmetrical amplifier. This diode $D_1$ conducts in the direction from terminal P to the collector of $T_1$. The collector of the transistor $T_2$ is connected to the terminal P via the diode $D_2$, which passes current to the terminal P via the collector $T_2$. The collectors of the transistors of $T_3$ and $T_4$ are connected in a similar manner to a terminal Q via the diodes $D_3$ and $D_4$, this terminal constituting a tap of the impedance which is connected to the input 9 of the symmetrical amplifier.

Arranged between the output of the switching circuit 14 and the input terminal 8 of the symmetrical amplifier there is an impedance consisting of a resistor 41, which is arranged between the switching network 14 and the terminal P, and a two-terminal network 42 arranged between the terminal P and the terminal 8. The two-terminal network 42 consists of two oppositely directed parallel diode branches 43 and 44 in series with the parallel arrangement of two oppositely directed diodes 45 and 46 and a resistor 47.

An impedance, consisting of the resistor 48 between the switching network 15 and the terminal Q and the two-terminal network 49 between the terminal Q and the terminal 9, is arranged between the output of the switching network 15 and the input terminal 9 of the symmetrical amplifier. The two-terminal network 49 is formed, in a similar manner as the two-terminal network 42, by means of diodes and a resistor 97.

When, in the closed subscriber's loop, a direct current I flows from the terminal 10 to the terminal 11, this being the case when the switching networks 14, 15 are in the shown position, this direct current flows through the resistor 19, the emitter-collector space of the transistors $T_1$ and $T_4$ and the resistor 20. The voltage drop across the resistors 19 and 20 is sufficient to reduce the collector potential of $T_1$ to below that of the terminal P and to increase the collector potential of $T_4$ to above the potential of the terminal Q. Consequently, the two diodes $D_1$ and $D_4$ are conducting and the potential of the terminals P and Q is the same, but for a diode voltage, as that of the collectors of the tranaistors $T_1$ and $T_4$. The difference between the potential of terminal 8, that is to say of the base of transistor $T_1$ and the potential of terminal P is equal to the voltage drop across the diode branch 43 and the diode 45. Finally, it is clear that when a direct current I flows in the subscriber's line, the base voltage of the transistor $T_1$ is fully dependent on the collector voltage, as, into the pass direction this base voltage differs only for a few diode voltages from the collector voltage. It is clear that this also applies to the base and collector voltages of the transistor $T_4$. Finally, it can be shown in the same manner that when the transistors $T_3$ and $T_2$ have been rendered conductive, so that the direct current in the subscriber's line flows in the other direction, the diodes $D_3$, $D_2$ become conducting and render it possible to make the base voltage dependent on the collector voltage of these transistors via the two-terminal networks 42 and 49.

The variable speech currents which are formed in the subscriber's line are short-circuited by the by-pass capacitor 18 via the base-emitter diodes of the transistors $T_1$ and $T_4$, when these transistors are conducting. This capacitor 18 must satisfy the requirement that it has a low impedance for the speech currents relative to that of the two-terminal networks 42 and 49. As the two-terminal network 42 passes, for example, the small base current of the transistor $T_1$, the diode branch 43 behaves as a rather high resistance and the parallel arrangement of the diode 45 and the resistor 47 predominantly behaves as the resistor 47. Finally, the value of this resistor 47 determines the very low impedance value of the two-terminal network 42 relative to the speech currents. This also applies to the resistor 97 in the two-terminal network 49. It is, for example, possible to use a value of 15 kΩ for the resistors 47 and 97, so that the capacitance of the capacitor 18 can be much smaller than that of the by-pass capacitor which would be disposed at the terminals of the limiting resistors 19 and 20 whose characteristic value is 150Ω.

Other embodiments of the invention will now be described which do not only enable the realization of the functions described with reference to the current limitation, base current drive of the transistors and decoupling of the speech signals, but which also render it possible to improve the operation of this network when it is controlled for applying the ringing signal or the oscillation of the metering signal into the subscriber's line.

The operation of the network shown in FIG. 2 will first be described for the situation in which it is controlled so that the ringing signal, having a frequency of, for example, 50 Hz, appears at the subscriber's line. As described above the switching networks 14 and 15 are then controlled by complementary binary signals X and $\overline{X}$, the binary signal X being, for example, a delta modulated signal obtained from encoding a sinusoidal 50 Hz signal. When the ringing signal is transmitted, the subscriber's loop is open and the supply lines 6 and 7 are connected to the potentials $+E$ and $-E$, respectively. Via the impedances 41 and 42 on the one hand and via the impedances 48 and 49 on the other hand the charging voltage $+2E$ is then applied to the capacitor 18 when the bits of the delta signal X have, for example, the value "1", and the discharge voltage $-2E$ when these bits have the value "0". During this operation of the network the diodes $D_1$, $D_2$, $D_3$, $D_4$ never conduct because of the charge condition of the capacitor 18 and the rather low voltage drop across the resistors 19 and 20 and a reconstruction of the 50 Hz signal is produced across the terminals of the capacitor 18. This reconstructed signal, which is the result of a sequence of charge and discharge operations of the capacitor 18, depending on the value of the delta bits, has the general form of a sinesoid. Since substantially the same voltage is present across the capacitor 18 and at the terminals of the subscriber's line, it is important for the peak values of this sinusoidal voltage to attain approximately the maximum and the minimum value $+2E$ and $-2E$, but without limitation of the sinusoid. Namely, the object is to obtain, on the one hand, a ringing voltage which is sufficient to energize the bell of the subscriber's set and, on the other hand, to avoid the generation, at a low frequency, of harmonics having a multiple of 50 Hz in the subscriber's line.

Figure 4:
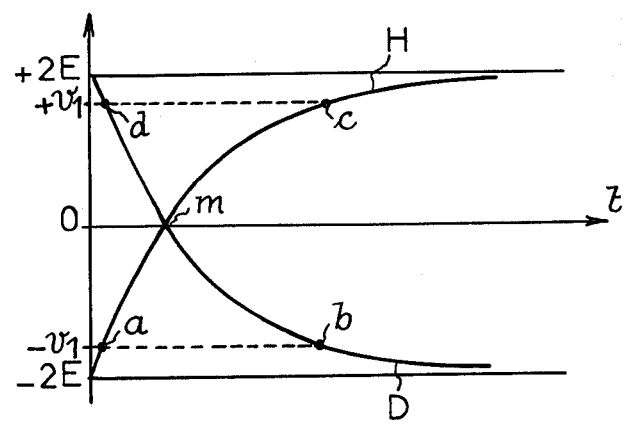
FIG. 4 shows the charge and discharge curves of a capacitor, to illustrate the difficulties which might be encountered in the generation of the ringing signal.

It is not easy to accomplish the above object because the variations of the voltage Δv across the capacitor 18, produced by each delta bit, depend to a considerable extent on the original charge condition of the capacitor. This is shown in FIG. 4 in which the letter H denotes the exponentially varying discharge curve of the capacitor 18, which capacitor is initially charged with voltage $-2E$ and to which, at the instant $t=0$, the voltage $+2E$ is applied via the resistance of the elements 41, 42, 48 and 49. The letter D denotes the discharge curve of capacitor 18 which is initially charged with the voltage +2E and to which the voltage −2E is applied via the same resistance at the instant t=0.

From these curves it appears that when there is initially a voltage −v$_1$ across the capacitor 18, which voltage approaches the voltage −2E, a delta bit having the value "1" produces a considerable increase in voltage Δv which is proportional to the slope of the curve H at the point a and that a delta bit having the value "0" slightly reduces the voltage −Δv which is proportional to the slope of the curve D at the point b. If, on the other hand, an initial voltage +v$_1$, which approaches the +2E voltage is present across the capacitor 18, a delta bit having the value "1" causes a slight increase in the voltage Δv which is proportional to the slope of the curve H at the point c and a delta bit having the value "0" produces a considerable decrease of the voltage −Δv, which is proportional to the slope of the curve D at the point d. Only in the case when the voltage between the terminals of the capacitor 18 is zero (point of intersection m of the two curves H and D) will the increase and decrease of the voltage be substantially equal. Owing to the fact that the increases and decreases of the voltage for the delta bits "1" and "0" near the maximum voltages −2E and +2E across the capacitor 18 are not equal, it is difficult to control the network so that the 50 Hz ringing voltage reaches in all circumstances approximately the value +2E and −2E, without being distorted as a result of clipping. The same drawback is found in the network described with reference to FIG. 1.

Figure 3:
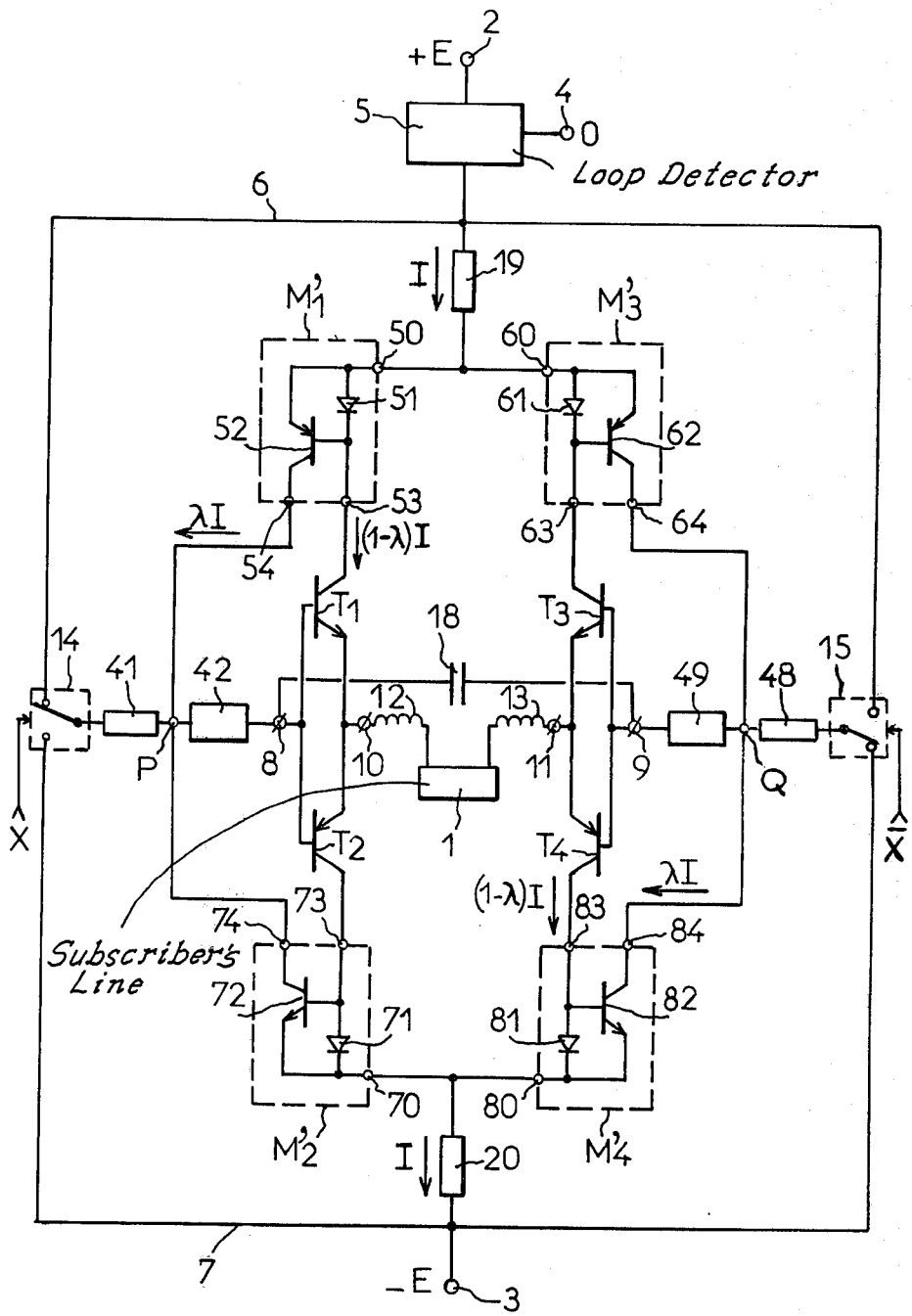
FIG. 3 shows a circuit diagram of a third embodiment of the invention, which can be used for a network with delta-coded signals for generating the ringing signal.

It is possible to obviate this drawback by means of the network shown in FIG. 3, which is based on the same idea as the one used in the circuit shown in FIG. 2 for making the base voltage of the transistors of the symmetrical amplifier dependent of their collector voltage.

The circuit diagram of FIG. 3 includes to a great extent the same elements as the circuit shown in FIG. 2, and those elements are given the same reference numerals. Particularly, the two two-terminal networks 42 and 49 are identical and are therefore not shown in detail. The diodes D$_1$ and D$_4$ are absent but, as will be described hereinafter, their role is performed by elements of the current mirrors M'$_1$ to M'$_4$.

The current mirrors M'$_1$ and M'$_3$ are connected by means of their supply terminals 50 and 60 to the supply line 6 via the limiting resistor 19. In the embodiment shown in the drawing the current mirror M'$_1$ consists of a diode 51 which is connected between the base and the emitter of the pnp transistor 52 in the same direction as the emitter-base diode formed by that junction of this transistor. The base and the collector of the transistor 52 form the input terminal 53 and the output terminal 54, respectively, of the current mirror M'$_1$. The current mirror M'$_3$ is similarly formed by the diode 61 and the transistor 62, and comprises input and output terminals 63, 64. The input terminals 53 and 63 are connected to the collectors of the transistors T$_1$ and T$_3$. The output terminals 54 and 64 are connected to the terminals P and Q, respectively.

The other current mirrors M'$_2$ and M'$_4$ are connected by means of their supply terminals 70 and 80 to the supply line 7 via the other limiting resistor 20. These current mirrors are formed by the diodes 71 and 81 and the npn transistors 72, 82. The input terminals 73, 83 of these current mirrors are connected to the collector of the transistors T$_2$, T$_4$ and their output terminals 74, 84 are connected to the terminals P and Q.

The network shown in FIG. 3 has two different modes of operation, which relate to feeding the subscriber's line with direct current and with ringing alternating current, respectively.

When the switching networks 14, 15 are permanently adjusted to the shown position for causing a current I to flow through the line 1 into the direction from the terminal 10 to the terminal 11, this current I, which appears at the supply terminals 50 and 80 of the current mirrors M'$_1$ and M'$_4$, is sufficiently high to drive the transistors 52 and 82 to the saturation state. The collector voltage of the pnp transistor 52 gets higher than the base voltage thereof and the diode formed by the collector-base junction of this transistor becomes conductive in the pass-direction and thus performs the function of the diode D$_1$ in FIG. 2. The collector voltage of the npn transistor 82 becomes lower than the base voltage thereof, and the diode formed by the collector-base junction of this transistor becomes conducting in the pass direction and thus performs the function of diode D$_4$ in FIG. 2. It is clear that, as in the network of FIG. 2, the base voltages of the transistors T$_1$ to T$_4$ inclusive is made to depend on the collector voltage thereof when the subscriber's line is fed with direct current.

If the switching networks 14 and 15 are controlled by the delta signals X and $\overline{X}$ to cause the 50 Hz ringing alternating current to flow in the subscriber's line, this current which appears for one current direction at the supply terminals 50 and 80 of the current mirrors M'$_1$ and M'$_4$ never gets sufficiently high to drive the transistors 52 and 82 to the saturation state; operation is equally satisfactory, as the line 1 is then closed via the comparatively high impedance of the bell. The current mirrors M'$_1$ and M'$_4$ then begin to operate in a normal manner in one current direction and the current mirrors M'$_2$ and M'$_3$ in the other current direction.

These current mirrors M'$_1$ to M'$_4$ inclusive, are designed so as to supply, during normal operation, a current $(1-\lambda)$ I at their input terminals 53, 63, 73, 83 and a current $\lambda$I at their output terminals 54, 64, 74, 84, where I is the instantaneous value of the ringing current flowing in the subscriber's line and flowing through the resistors 19 and 20, and $\lambda$ is a coefficient between zero and one.

The instantaneous voltage v across capacitor 18 between the input terminals 8 and 9 of the symmetrical amplifier is also present across the terminals of the subscriber's line 1, not considering voltage drops in two base-emitter diodes of the transistors T$_1$ to T$_4$, inclusive. Denoting the impedance of the subscriber's line W, the current in this line is, to a first approximation, I=v/W, so that the currents $\lambda$I which are produced at the output terminals of the current mirrors, are such that $\lambda I = \lambda(v/W)$.

Figure 5:
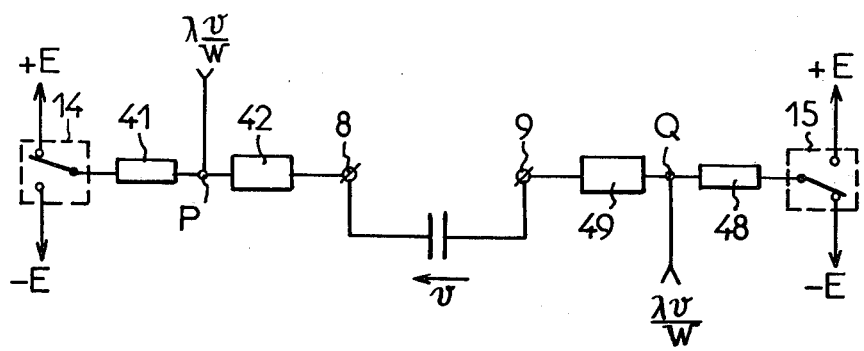
FIG. 5 shows the discharge current path of the by-pass capacitor of the network shown in FIG. 3.

To explain the effect of these currents ($\lambda$v/W), FIG. 5 shows a simplified circuit diagram of FIG. 3, showing the charge path of the capacitor 18. The currents ($\lambda$v/W), which originate at the current mirrors M'$_1$ and M'$_4$ are applied to the terminals P and Q, located between the resistor 41 and the two-terminal network 42 and between the resistor 48 and the two-terminal network 49.

It can be shown that the voltage v across the capacitor 18, having a capacitance C, satisfies the differential equation:

$$v + \frac{2rC}{K} \frac{dv}{dt} = \frac{2E - 6vd}{K} \quad (1)$$

-continued where $K = 1 - \frac{2r\lambda}{W}$

In this equation r is the value of the resistors 41 or 48; $v_d$ is the voltage drop at the terminals of a diode, through which current flows into the forward direction and the term 6 $v_d$ represents the six diodes of the two-terminal networks 42 and 49 which are arranged in series for charging the capacitor 18. This term 6 $v_d$ (approximately 3 volts) which is small relative to 2E (for example 96 volts) will be neglected in the further course of this description.

The differential equation (1) shows that the rule which governs the charging of the capacitor 18, is the rule which would be obtained when a voltage $2E^* = (2E/K)$ is applied to this capacitor via a resistor having a value $(2r/K)$, the term 6 $v_d$ being neglected. Using for the parameter λ of the current mirrors a value such that the dividend K is lower than 1, for example equal to ½ or ¼, results in the curve H', shown in FIG. 6, for the charge curve of the capacitor 18, which can be compared with the curve H in FIG. 4. For the present description, the ordinates of the diagram shown in FIG. 6 correspond to the ordinates shown at a first scale I. The curve H' corresponds to the charging of a capacitor which was initially charged with a voltage $-2^*$ and to which a voltage $+2E^*$ is applied via a resistor having a value $(2r/K)$ at the instant t=0. Should K be smaller than 1, then of course 2E* is greater than 2E. The curve D', which can be compared with the curve D in FIG. 4 denotes the discharging of a capacitor which was initially charged with a voltage $+2E^*$ to which a voltage $-2E^*$ is applied at the instant t=0 via the resistance $(2r/K)$. The sections of these curves H' and D' which must be taken into consideration are of course those sections which are located between the extreme voltages $+2E$ and $-2E$, which may occur across the capacitor 18.

Figure 6:
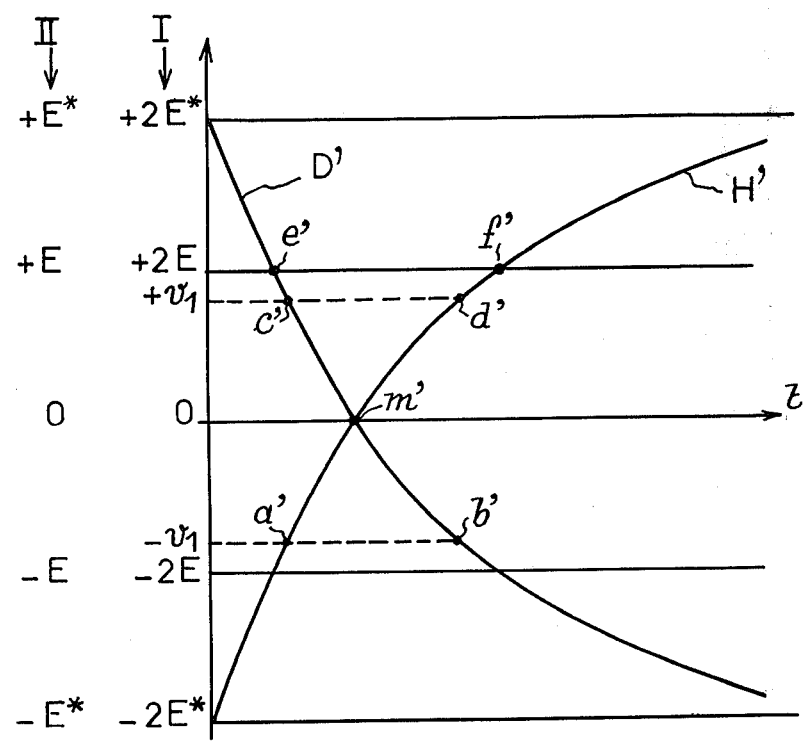
FIG. 6 shows the charge and discharge curves of the by-pass capacitor of the network shown in FIG. 3.

FIG. 6 shows the improvement which can be obtained by the application of the currents (λv/W) to the terminals P and Q, when the network is controlled by delta signals for the generation of the ringing signal. When there is a voltage $-v_1$ across the capacitor 18, this voltage being near $-2E$, a delta bit having the value "1" or "0" causes an increase or a decrease of the voltage which is proportional to the slope of the curves H' or D' in the points a' or b'. Likewise, when there is a voltage $+v_1$ which is near the voltage $+2E$ across the capacitor 18, a delta signal having the value "1" or "0" causes an increase or decrease in the voltage which is proportional to the slope of the curves H' or D' in the points c' or d'. It will be apparent from FIG. 6 that all slopes are rather close to each other, so that it is easy to obtain, from the delta signals X and $\overline{X}$, a proper reproduction of the sinusoidal 50 Hz ringing signal across the capacitor 18 and in the subscriber's line with an amplitude which can be easily controlled to a value approaching $+2E$ and $-2E$.

Figure 7:
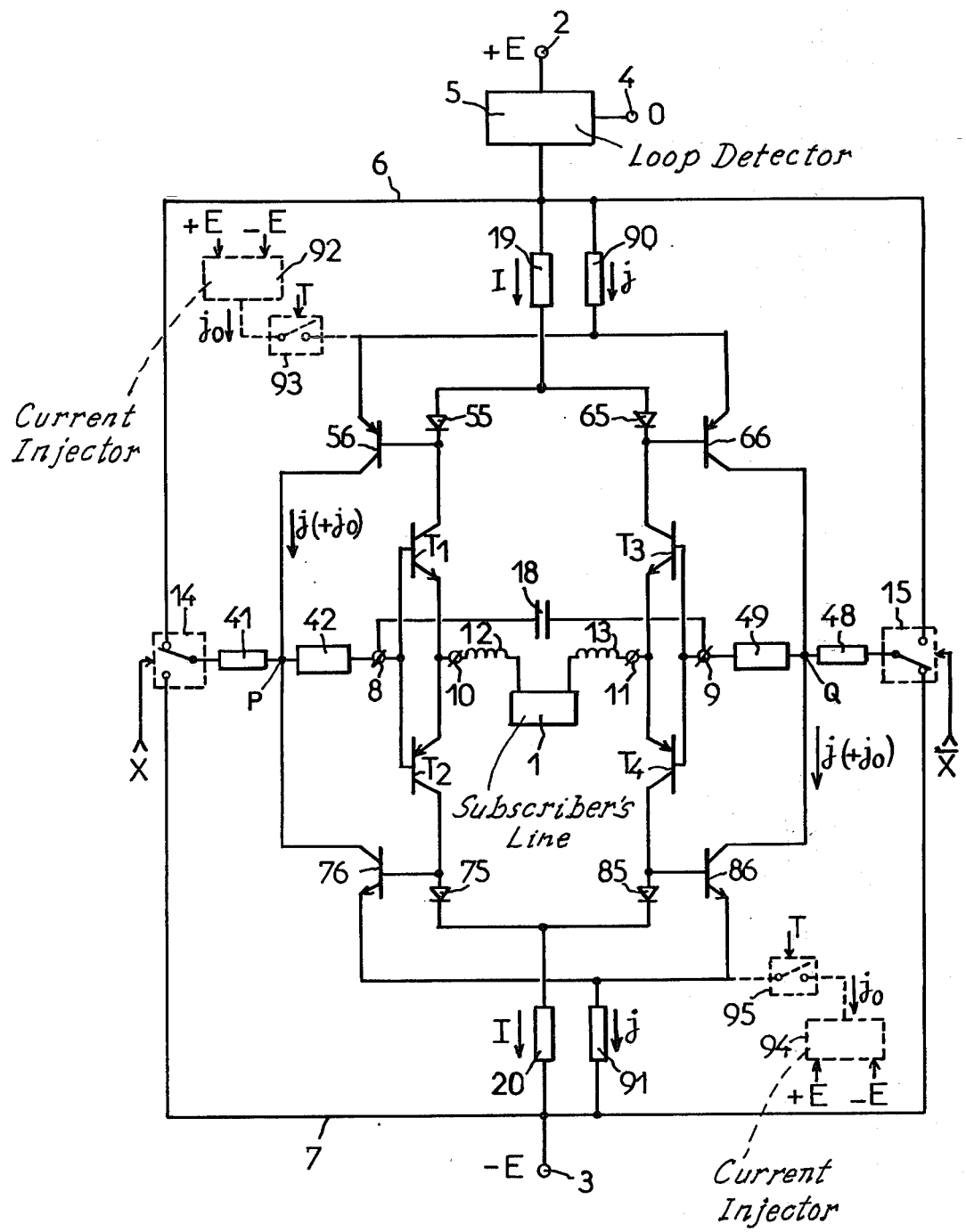
FIG. 7 shows a circuit diagram of a fourth embodiment of the network according to the invention to which delta-coded signals are applied for generating the ringing signal and the metering signal, FIG. 8, including a–d, shows diagrams which illustrate the improvement introduced by the network of FIG. 7 in the generation of the metering signal.

FIG. 7 shows a further embodiment of the network according to the invention which has the same properties as those of FIG. 3 as regards the base voltage dependence on the collector voltage of the transistors of the symmetrical amplifier and the realization of the ringing signal.

A number of elements in the circuit diagram of FIG. 7 have the same function as those in FIG. 3 and are given the same reference numerals. The current limiting resistor 19 is connected to the collector of the transistors $T_1$ and $T_3$ via the diodes 55 and 65, which are arranged in the pass direction with respect to the collector current of these transistors. The supply line 6 is connected to the emitters of the two pnp transistors 56 and 66 via the resistor 90. The bases of these transistors are connected to the collectors of the transistors $T_1$ and $T_3$ and their collectors are connected to the terminals P and Q. Similarly, the current limiting resistor 20 is connected to the collectors of the transistors $T_2$ and $T_4$ via the diodes 75 and 85. The supply line 7 is connected to the emitters of the two npn transistors 76 and 86 via the resistor 91. The bases of these transistors are connected to the collectors of the transistors $T_2$ and $T_4$ and their collectors are connected to the terminals P and Q.

When the direct voltage in the subscriber's line flows from terminal 10 to terminal 11, the transistors $T_1$ and $T_4$ are conductive and the voltage drop which is produced by this comparatively large current (as the subscriber's loop is closed) through the resistor 19 and the diode 55 on the one hand and through the resistor 20 and the diode 85 on the other hand, is sufficient to drive the transistors 56 and 86 to the saturation state, in response to which a connection is formed between terminal P and the collector of the transistor $T_1$, via the collector-base diode of the transistor 56 into the pass-direction, and between terminal Q and the collector of the transistor $T_4$ via the collector-base diode of the transistor 86 in the pass-direction. In the same manner as shown in the diagram of FIG. 3, the interdependence of the base voltages of the transistors $T_1$ and $T_4$ and their collector voltages is thus realized.

When the 50 Hz ringing alternating current flows in the subscriber's line in response to suitable delta signals X and $\overline{X}$, it is sufficient to drive the transistors 56, 86 and 66, 76 to saturation. This ringing current, which has the instantaneous value I, flows through the resistors 19 and 20 with a value R/2 and produces a current $j = (R/2s) I$ in the resistors 90 and 91 which have a value s. When the current I in the subscriber's line flows in such a direction that the transistors $T_1$ and $T_4$ conduct, the current j is passed to the emitters of the transistors 56 and 86. The collector current of these transistors, which is substantially equal to this current j, is applied to the terminals P and Q into the direction shown in the Figure. The coefficients (R/2s) which indicates the relationship between the current j and the current I, can be accurately chosen as the coefficient λ of the network shown in FIG. 3 and, consequently, the same improvement, illustrated in FIG. 6, can be obtained in the formation of the ringing signal.

As shown above, a subscriber's network of the described type can also be used for applying the metering signal with a frequency of, for example, 12 kHz to the subscriber's line.

Figure 8:
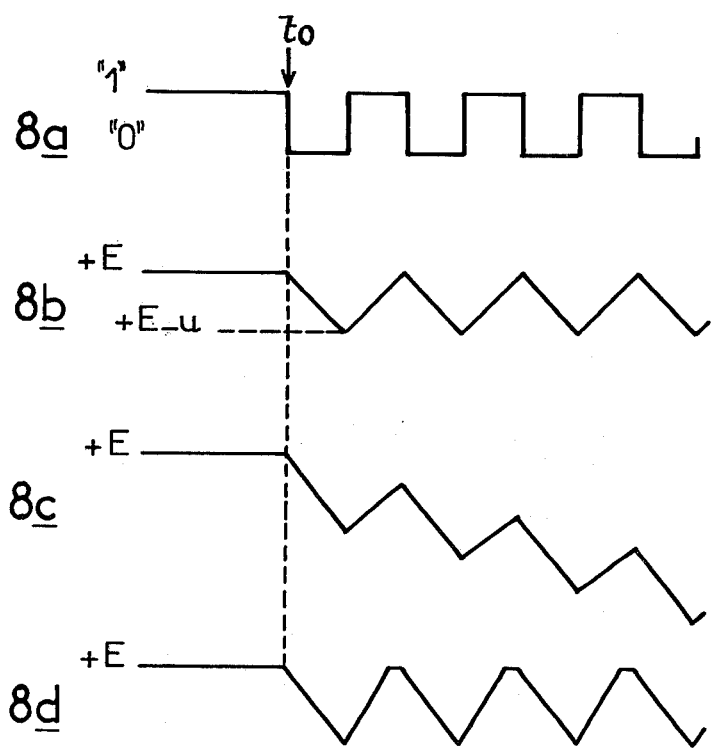

The diagrams shown in FIG. 8 illustrate the following description. The oscillation trains of the metering signal must be transmitted when the subscriber's loop is closed. As mentioned above, the loop detection device 5 must adjust the potential on the positive supply line 6 to zero when the subscriber's loop is closed, so that then the network is fed by a voltage $+E$.

Between the oscillation trains of the metering signal, the binary signal X has a constant value, for example "1", and the switching networks 14 and 15 are adjusted to the position shown in the Figure, so that a d.c. voltage $+E$ appears across the terminals of capacitor 18, which voltage is also produced across the terminals of the subscriber's line 1. In the diagram of FIG. 8 $t_0$ denotes the instant at which an oscillation train is started. Diagram 8a denotes the binary signal X which has the value "1" until the instant $t_0$. The diagrams 8b, 8c and 8d show the variation of the voltage across the terminals of capacitor 18 for different cases to be considered hereinafter, the voltage +E being present across the capacitor 18 until the instant $t_0$ in all these cases.

During the oscillation trains of the metering signal the binary signal X is, for example, formed by a sequence of bits which alternately assume the values "1" and "0" with the frequency of 12 kHz of the oscillations in the metering signal. In response to such a binary signal X and the complementary signal $\overline{X}$, the networks 14 and 15 ensure the alternate charging and discharging of capacitor 18. If the time constant of the charging circuit of capacitor 18 has a suitable value and if the charge and discharge slopes of this capacitor are identical, a symmetrical sawtooth voltage of the shape shown in FIG. 8b is produced across the terminals of capacitor 18 and also across the terminals of the subscriber's line 1 after the instant $t_0$. The portions having a negative slope, of this sawtooth correspond to the discharge of capacitor 18 in response to bits X=0 and the portions having a positive slope correspond to the charging of the capacitor in response to bits X=1. The maximum and the minimum of this sawtooth voltage reach precisely the values +E and +E−u, wherein u is the peak-peak value required for the oscillations of the metering signal. This required amplitude u has a low value relative to the d.c. voltage +E and therefore the average value of the voltage across the capacitor 18 and, consequently, across the terminals of the subscriber's line remain substantially equal to d.c. voltage +E during each oscillation train of the metering signal.

However, the voltage across the capacitor 18 has only the shape shown in FIG. 8b after the instant $t_0$ for the situation in which the charge time-constant and the discharge time-constant of this capacitor are the same. However, this condition is not satisfied, not even in the network shown in FIG. 7 described so far, wherein the measures already taken as described above are only capable of reducing the inequality of the charge and discharge slopes of capacitor 18.

The effect of these measures, as far as it relates to the transmission of the metering signal oscillations, can be explained by means of the two curves H' and D' in FIG. 6 and the voltage values shown on scale II. The capacitor 18 is charged to the voltage +E until the instant $t_0$. After the instant $t_0$ the capacitor discharges, for bits having the value "0" of the binary signal X, in accordance with curve D' between the points e' and m'; for the bits, having the value "1" of the binary signal X, capacitor 18 is charged in accordance with curve H' between the points m' and f'. It will be apparent that the absolute value of the slope of the discharge curve of capacitor 18 always exceeds the absolute value of the slope of the charge curve. From this it follows that the voltage across capacitor 18 after the instant $t_0$ changes in a sawtooth-shaped manner with a decreasing average value, as illustrated in diagram 8c; the average value of this voltage can only become constant for the zero value, the charge and discharge slopes of capacitor 18 then being equal.

In order to achieve the required situation that the average value of the voltage across the capacitor 18 and consequently across the terminals of the subscriber's line is stable and approaches the value of the voltage +E during the transmission of the metering signal oscillations, the elements and connections shown in the circuit of FIG. 7 by means of dotted lines are used. One of these elements is a current injector 92 which is, for example, fed by the potential +E and −E of the supply terminals 2 and 3 and produces a current $j_0$. This current $j_0$ is passed to the emitter of a transistor 56 via the interrupter 93, which is controlled by a control signal T. This control signal T is such that the interrupter 93 is closed when the bits of the binary signal X are equal to "1". If this interrupter 93 is closed, the collector current of transistor 56, which is fed to the terminal P, becomes equal to $j+j_0$. A further current injector 94 produces $j_0$ with a direction opposite to the direction caused by the current injector 92. If the current interrupter 95 is closed via the control signal T, this current $j_0$ is applied to the emitter of the transistor 86 so that the collector current of this transistor, which is applied to the terminal Q, becomes equal to $j+j_0$.

With the above-described complete circuit of FIG. 7 the network operates as follows as regards the transmission of the metering signal oscillations. This operation is illustrated in the diagram 8d. Prior to the instant $t_0$, the switching networks 14 and 15 are in the shown positions, the capacitor being charged to the voltage +E, the transistors $T_1$ and $T_4$ being in the conductive state and the transistors 56 and 86 being in the saturated state, as mentioned above.

When, at the instant $t_0$, the first bit having the value "0" of the binary signal X appears, the switching networks 14 and 15 change to the other position, the transistors $T_2$ and $T_3$ become conductive, the transistors 66 and 76 are not saturated and their collector current, having a value j is applied to the terminals P and Q, so that the capacitor 18 is discharged with a slope which corresponds to the value of this current j, that is to say, in accordance with FIG. 6, with the slope of the curve D' in the point e'.

When the second bit having the value "1" of the binary signal X appears, the switching networks 14 and 15 are readjusted to the shown position. The transistors $T_1$ and $T_4$ become conductive and the transistors 56 and 86 are not saturated. As the interrupter networks 93 and 95 are closed simultaneously, the collector current of the transistors 56 and 86, which is applied to the terminals P and Q, assume the value $j+j_0$. So the capacitor 18 is charged with a slope, which corresponds to the value of this current $j+j_0$. It is possible to choose $j_0$ so that the charge slope of the capacitor 18 is somewhat larger than the discharge slope, which is determined by the value of the current j. It appears that the capacitor 18 is charged with the voltage +E slightly prior to the appearance of the next bit having a value "0" of the binary signal X, which determines the slight clipping of the sawtooth appearing in the diagram 8c. This diagram clearly shows that the average value of the voltage across the capacitor 18 remains stable and near the voltage +E during the transmission of the metering signal oscillations. The same result can be obtained for the voltage across the terminals of the subscriber's line.

For one skilled in the art it will be easy to use the above-described circuits for the transmission of the metering signals in the network of FIG. 3, the fundamental idea, for the considered current direction of the direct current in the subscriber's line, being the increase of the charge slope of the capacitor 18 in order to make this slope somewhat larger than the discharge slope. Obviously, for the other current direction, this situation for the charge and discharge slopes of the capacitor 18 must be reversed.

What is claimed is:

1. A subscriber's connecting network comprising a symmetrical power amplifier having two pairs of transistors, the transistors of each being being of complementary types, the bases and emitters of each pair of transistors being interconnected and forming two input and two output terminals, respectively, of the symmetrical amplifier, first means for coupling the collectors of the transistors of one type to a first terminal of a d.c. voltage source and second means for coupling the collectors of the transistors of the other type to a second terminal of the d.c. voltage source, means for connecting the output terminals to the terminals of a subscriber's line and means for coupling each of the two input terminals to a respective one of the terminals of the d.c. voltage source via an input impedance, said first and second coupling means each including a resistor for limiting the current in the subscriber's line, said resistors being identical, means for making the base voltages of the transistors dependent on the collector voltages thereof, said last-named means including means, coupled to each resistor, for supplying a current i which is proportional to the current through the respective resistor, a pair of current mirrors each having an input and an output terminal, means, coupled to each of said current supply means, for applying the respective current i to an input terminal of a respective one of said pair of mirrors and means for connecting said output terminal of each mirror to a respective one of said two input terminals of said amplifier.

2. A subscriber's connecting network as claimed in claim 1 including two pairs of said current mirrors, each mirror of one pair being associated with a respective one of said transistors of said one type and each current mirror of the other pair being associated with a respective one of said transistors of said other type, and wherein said current applying means includes means for switching said current i between said one and said other pair of mirrors.

3. A subscriber's connecting network comprising a symmetrical power amplifier having two pairs of transistors, the transistors of each pair being of complementary types, the bases and the emitters of each pair of transistors being interconnected and forming two input and two output terminals, respectively, of said symmetrical amplifier, first means for coupling the collectors of the transistors of one type to a first terminal of a d.c. voltage source and second means for coupling the collectors of the transistors of the other type to a second terminal of the d.c. voltage source, means for connecting the output terminals to the terminals of a subscriber's line, third means for coupling one of said two input terminals to one terminal of the d.c. source, fourth means for coupling the other of said two input terminals to the other terminal of the d.c. source, said first and second coupling means each including a resistor for limiting the current in the subscriber's line, said resistors being identical, said third and fourth means each including a circuit forming an input impedance for said amplifier and a diode connected between the collector of each of said transistors and a respective one of said circuits so that a direct current flowing in the subscriber's line through two of said transistors of said amplifier drives two of said diodes to the conductive state so that the base voltage becomes dependent on the collector voltage of the conducting transistors, said network further comprising a by-pass capacitor for speech currents in the subscriber's line arranged between said input terminals of said amplifier.

4. A subscriber's connecting network as claimed in claim 3 wherein said third and forth coupling means each includes a further pair of complementary transistors, the base of each transistor of each of said further pairs being connected to the collector of a complementary one of the respective transistors of said two pairs and the collector of each transistor of each further pair being connected to an associated one of said circuits, the collector-base junction of each transistor of each further pair forming a respective one of said diodes, and means for feeding a current to the base and the emitter of each of said transistors of said further pairs such that in the presence of a ringing signal on the subscriber's line the collector current flowing into the associated circuit from the transistor connected thereto is $\lambda I$, where I is the current in the subscriber's line and $\lambda$ is a predetermined factor between zero and one, and when the subscriber's line is fed with direct current that transistor is driven to saturation.

5. A subscriber's connecting network as claimed in claim 3 or 4 wherein said circuits forming said input impedances each includes a resistance section and a two-terminal network connected to a common tap, said diodes being connected to said tap of an associated one of said circuits, said two-terminal network including two oppositely directed parallel diode branches and a series resistance of a value which is high relative to the impedance of said by-pass capacitor.

6. A subscriber's connecting network as claimed in claim 5 wherein said factor $\lambda$ is such that the value of the coefficient $K = (1 - 2r\lambda)/W$ is lower than unity, where W is the air resistance of the subscriber's line and r is the resistance of said resistance section.

7. A subscriber's connecting network as claimed in claim 5 wherein said feeding means in the presence of a metering signal on the subscriber's line feeds a current to the associated transistor such that the collector current from said associated transistor flowing into said tap is alternately equal to $\lambda I$ and $\lambda I + j_0$, where $j_0$ is a predetermined direct current.

* * * * *